US011105780B2

(12) United States Patent
Cormier et al.

(10) Patent No.: US 11,105,780 B2
(45) Date of Patent: Aug. 31, 2021

(54) COMPRESSION FITTING WITH COUPLED FERRULE

(71) Applicant: Waters Technologies Corporation, Milford, MA (US)

(72) Inventors: Sylvain Cormier, Mendon, MA (US); Kurt D. Joudrey, Chelmsford, MA (US); Joshua A. Shreve, Franklin, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 130 days.

(21) Appl. No.: 15/309,421

(22) PCT Filed: May 7, 2014

(86) PCT No.: PCT/US2014/037093
§ 371 (c)(1),
(2) Date: Nov. 7, 2016

(87) PCT Pub. No.: WO2015/171127
PCT Pub. Date: Nov. 12, 2015

(65) Prior Publication Data

US 2017/0153212 A1 Jun. 1, 2017

(51) Int. Cl.

| | |
|---|---|
| ***G01N 30/60*** | (2006.01) |
| ***B01D 15/22*** | (2006.01) |
| ***G01N 30/02*** | (2006.01) |

(52) U.S. Cl.
CPC ......... *G01N 30/6026* (2013.01); *B01D 15/22* (2013.01); *G01N 30/6034* (2013.01); *G01N 2030/027* (2013.01)

(58) Field of Classification Search
CPC ..... F16L 37/26; F16L 37/092; F16L 37/0841; G01N 30/60; B01D 15/22
See application file for complete search history.

(56) References Cited

U.S. PATENT DOCUMENTS 5,607,193 A * 3/1997 Guest .................. F16L 37/0925 285/308
5,938,919 A * 8/1999 Najafabadi ........ G01N 30/6047 210/198.2

(Continued)

FOREIGN PATENT DOCUMENTS

CN 101124027 2/2008
EP 0231076 A1 8/1989

(Continued)

OTHER PUBLICATIONS

Extended Search Report in European Application No. 148912439.9, dated Oct. 12, 2017; 9 pages.

(Continued)

*Primary Examiner* — Ryan B Huang
(74) *Attorney, Agent, or Firm* — Schmeiser, Olsen & Watts LLP

(57) ABSTRACT

The invention provides compression fittings and methods of assembling compression fittings. In exemplary embodiments, compression fittings are provided that include a fitting body, a ferrule and a tube. For example, the fitting body can be removably coupled to the ferrule when the tube is disposed therethrough.

13 Claims, 14 Drawing Sheets

101
100
104
103
107
110
102
125
120
118
112
111
115
117
113
121
129

(56) References Cited

U.S. PATENT DOCUMENTS

| | | | | |
|---|---|---|---|---|
| 7,316,777 | B2 * | 1/2008 | Loy, Jr. | B01L 3/565 210/198.2 |
| 8,702,130 | B1 | 4/2014 | Zelechonok | |
| 2008/0309076 | A1 * | 12/2008 | Cormier | A61M 39/12 285/256 |
| 2010/0156089 | A1 | 6/2010 | Zelechonok et al. | |
| 2011/0025047 | A1 | 2/2011 | Zelechonok et al. | |
| 2012/0228872 | A1 * | 9/2012 | Gamache | F16L 19/065 285/331 |

FOREIGN PATENT DOCUMENTS

| | | | |
|---|---|---|---|
| WO | 2006/083597 | | 8/2006 |
| WO | 2006091952 | A1 | 8/2006 |
| WO | 2012058513 | A1 | 5/2012 |

OTHER PUBLICATIONS

International Search Report & Written Opinion in International Patent Application No. PCT/US14/37093, dated Sep. 24, 2014; 9 pages.

International Preliminary Report on Patentability in International Patent Application No. PCT/US14/37093, dated Nov. 17, 2016; 78 pages.

Office Action in Chinese Application No. 201480080437.9, dated Oct. 26, 2018.

Office Action in Chinese Application No. 201480080437.9, dated May 7, 2019.

Examination Report in European Patent Application 14891243.9 dated Apr. 20, 2021.

* cited by examiner

COMPRESSION FITTING WITH COUPLED FERRULE

CROSS REFERENCE TO RELATED APPLICATION

This application is the National Stage of International Application No. PCT/US2014/037093, entitled COMPRESSION FITTING WITH COUPLED FERRULE, filed on May 7, 2014. The contents and teachings of this application are hereby expressly incorporated herein by reference in their entirety.

FIELD OF THE INVENTION

The present invention generally relates to connectors, and in particular, connectors useful in high pressure fluidic systems such as high performance liquid chromatography systems.

BACKGROUND

Instruments may utilize conduits for transportation of process fluids and sample compounds and/or for separation of sample compounds. For example, an instrument that performs liquid chromatography (LC) may include conduits. To perform analysis on fluids, it may be necessary to provide a fluidic connection between two conduits to facilitate a flow path for the fluid from a first conduit to a second conduit. Such connections should be leak resistant. It is also desirable to provide connections which add minimal volume to the system. These fluidic connections can be provided by zero dead volume fittings, in which an end of a first conduit butts directly against the end of a second conduit.

An exemplary type of zero dead volume fittings is a compression fitting. In one arrangement, a zero dead volume compression fitting assembly accomodates tubing inserted through a fitting body and a ferrule slidably disposed on the tubing. The fitting body, tubing, and ferrule can be inserted into the receiving body such that the tubing abuts a conduit in the receiving body and the ferrule engages the walls of the receiving body. Threads on the fitting body can then be engaged with threads on the receiving body to couple the fitting body to the receiving body and to compress the ferrule against the tubing and the receiving body to provide a fluid-tight seal.

There are numerous problems with current zero dead volume compression fittings. For example, the ferrule can slide off the tubing before insertion of the assembly into the receiving body, during insertion of the assembly into the receiving body, or when removing the assembly from the receiving body. The assembly components, i.e., the fitting body, tubing, and especially the ferrule, are typically small and easily lost when separated, such as when the ferrule slides off the tubing. In some instances, the ferrule may also remain within the receiving body when the assembly is removed. In such instances, the ferrule can be difficult to remove from the receiving body.

SUMMARY

The present invention generally provides compression fittings and methods of assembling compression fittings. In exemplary embodiments, compression fittings are provided that include a fitting body, a ferrule and a tube. The fitting body has a first end, a second end, an outer surface and an inner surface. The second end of the fitting body includes an inner circumferential recess and the inner surface defines a passageway through the fitting body between the first end and second end. The ferrule has a first end, a second end, an outer surface, and an inner surface. The inner surface of the ferrule defines a passageway through the ferrule between the first end and second end. The first end of the ferrule includes a coupling extension configured to removably engage the inner circumferential recess of the fitting body. For example, the coupling extension of the ferrule can include a plurality of members.

In other exemplary embodiments, the ferrule has a first end, a second end, an outer surface, and an inner surface. The inner surface of the ferrule defines a passageway through the ferrule between the first end and second end. The first end of the ferrule includes an inner circumferential recess. The fitting body has a first end, a second end, an outer surface and an inner surface. The inner surface of the compression fitting defines a passageway through the fitting body between the first end and second end. The second end of the fitting body includes a coupling extension configured to removably engage the inner circumferential recess of the ferrule. For example, the coupling extension of the fitting body can include a plurality of members.

The compression fittings described above can also include a tube configured to be disposed through the fitting body passageway and the ferrule passageway. The tube can prevent separation of the ferrule and the fitting body when the coupling extension of the ferrule engages the inner circumferential recess of the fitting body and the tube is disposed through the fitting body passageway and the ferrule passageway. In exemplary embodiments, the tube can cooperate with the ferrule and fitting body to couple the ferrule to the fitting body. For example, the ferrule can be coupled to the fitting body by an interference fit between the tube and the coupling extension of the ferrule. In some embodiments, the tube can include an outer cutout region configured to engage the coupling extension of the ferrule.

In a further aspect, a method of assembling a compression fitting is provided. In an exemplary embodiment, the method includes providing a fitting body, a ferrule, and a tube. The fitting body has a first end, a second end, an outer surface and an inner surface. The inner surface of the fitting body defines a passageway through the fitting body between the first end and second end. The ferrule has a first end, a second end, an outer surface, and an inner surface. The inner surface of the ferrule defines a passageway through the ferrule between the first end and second end. The tube is configured to be disposed through the fitting body passageway and the ferrule passageway.

Exemplary methods further include engaging the first end of the ferrule with the second end of the fitting body and inserting the tube through the fitting body passageway and the ferrule passageway, where the inserted tube prevents separation of the ferrule and fitting body. For example, the inserted tube can cooperate with the ferrule and the fitting body to couple the ferrule to the fitting body.

In some embodiments, the second end of the fitting body can include an inner circumferential recess and the first end of the ferrule can include a coupling extension. The coupling extension can be configured to removably engage the inner circumferential recess of the fitting body. For example, the ferrule can be coupled to the fitting body by an interference fit between the tube and the coupling extension of the ferrule. In some embodiments, the tube can include an outer cutout region configured to engage the coupling extension of the ferrule.

In other embodiments, the first end of the ferrule can include an inner circumferential recess and the second end of the fitting body can include a coupling extension. The coupling extension can be configured to removably engage the inner circumferential recess of the ferrule. For example, the ferrule can be coupled to the fitting body by an interference fit between the tube and the coupling extension of the fitting body.

In another aspect, a chromatographic system is provided. The chromatographic system includes a compression fitting and a chromatographic column. The compression fitting includes a ferrule and a fitting body. The ferrule can be configured to be coupled to the fitting body, e.g., as discussed with respect to the embodiments disclosed herein. The chromatographic column includes a first end, a second end, and a body extending between the first end and the second end. At least one of the first end and the second end can be configured to receive the compression fitting. In some embodiments, the chromatographic column can be disposed in a substantially vertical orientation.

The chromatographic system can also include a tube configured to be disposed through the fitting body and the ferrule, as discussed herein, such that the tube is in fluid communication with the chromatographic column. In exemplary embodiments, the tube can cooperate with the ferrule and the fitting body to couple the ferrule to the fitting body.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1A:
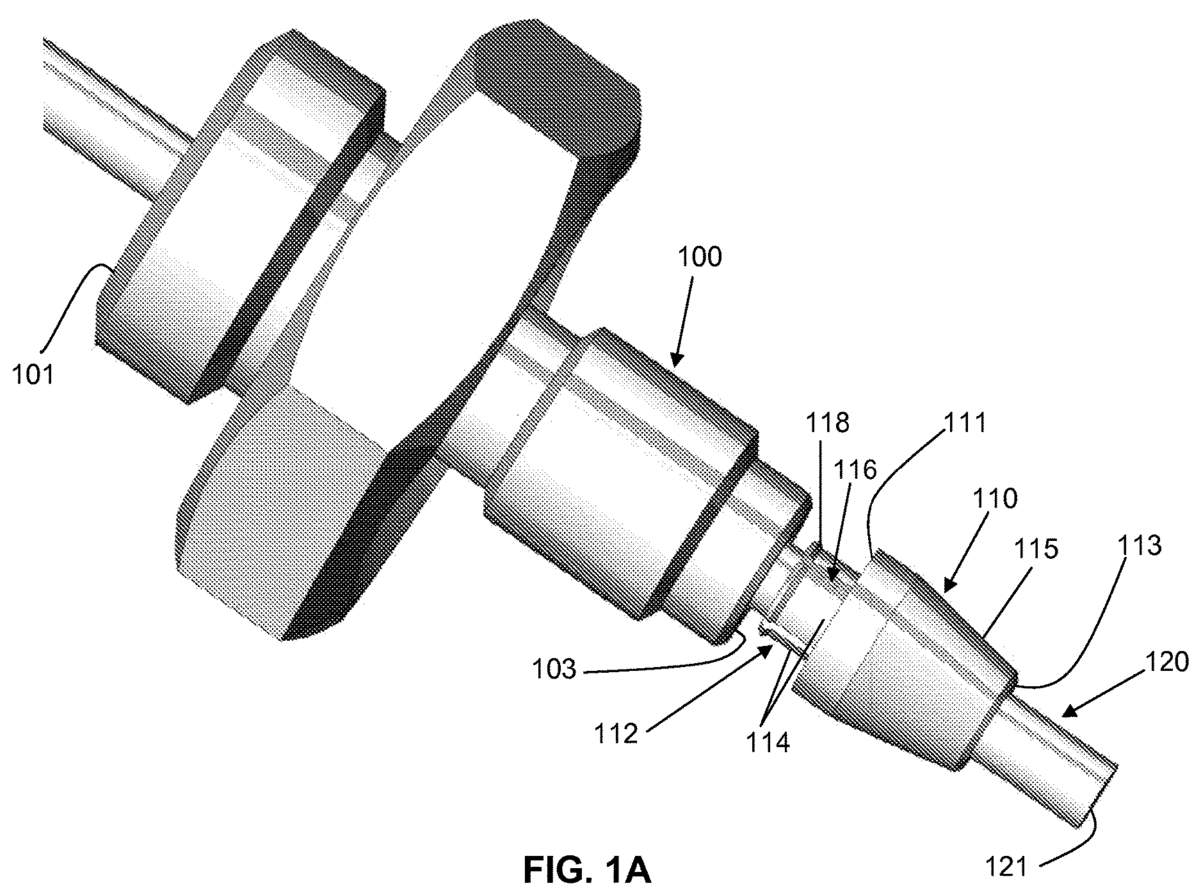
FIG. 1A is an isometric view of a fitting body, ferrule, and tube according to an embodiment of the invention.
Figure 1B:
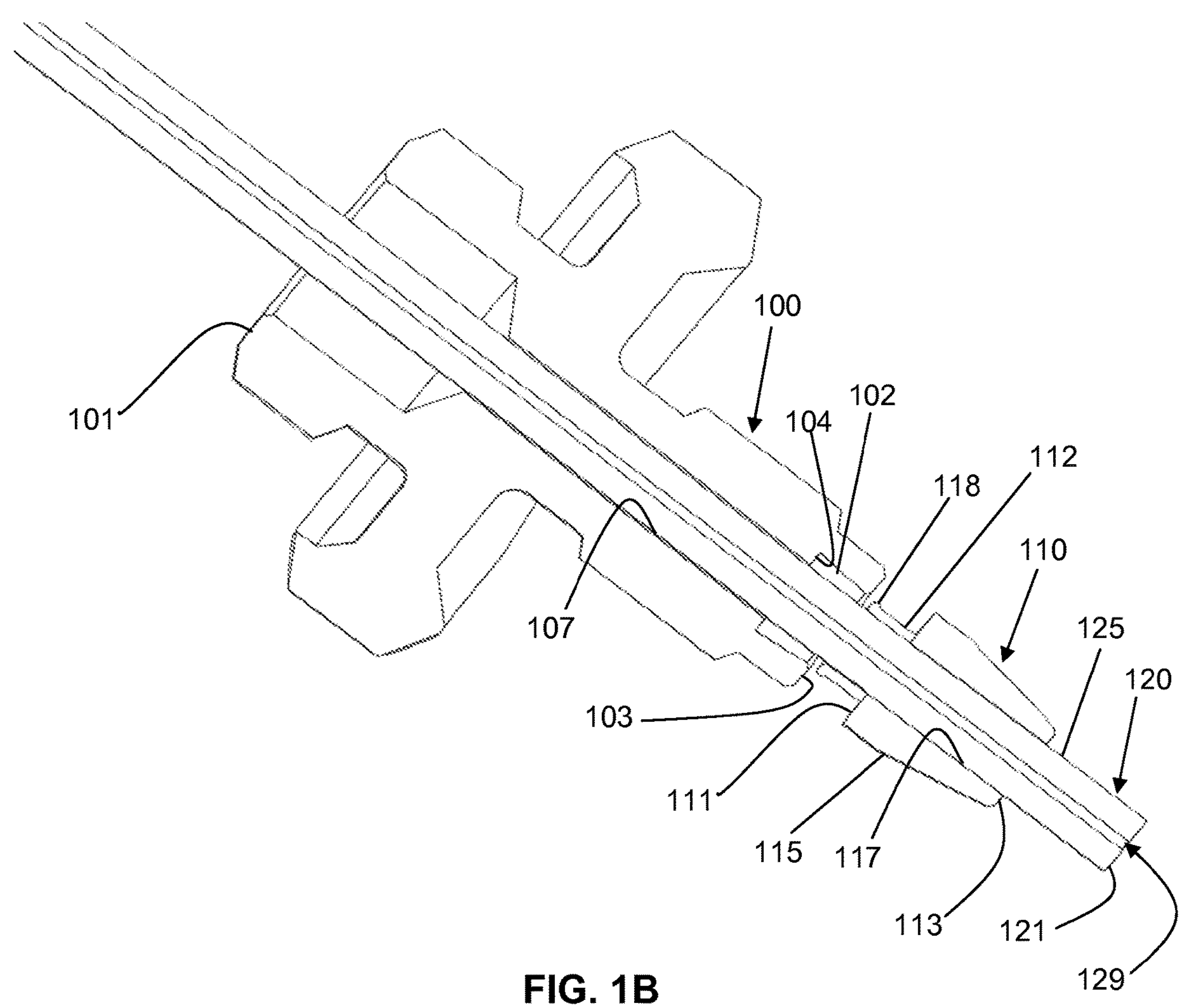
FIG. 1B is a sectional view of the fitting body, ferrule, and tube of FIG. 1A.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present invention generally provides compression fittings and methods of assembling compression fittings, e.g., zero dead volume compression fittings. In exemplary embodiments, compression fittings are provided that include a fitting body, a ferrule and a tube. The fitting body, tube, and ferrule can be inserted into a receiving body such that the tubing abuts a conduit in the receiving body and the ferrule engages the walls of the receiving body. Threads on the fitting body can then be engaged with threads on the receiving body to couple the fitting body to the receiving body and to compress the ferrule against the tubing and the receiving body to provide a fluid-tight seal.

The exemplary embodiments disclosed herein provide numerous advantages. For example, the disclosed embodiments provide compression fitting components in which the ferrule is removably coupled to the fitting body the ferrule thereby preventing accidental or inadvertent removal of the ferrule from the fitting body. As a result, the present invention can prevent, or substantially reduce the occurrence of, a ferrule sliding off tubing before insertion of the assembly into the receiving body, during insertion of the assembly into the receiving body, or when removing the assembly from the receiving body. The present invention can also prevent, or substantially reduce the occurrence of, a ferrule remaining within the receiving body when the assembly is removed therefrom.

FIGS. 1A-1D illustrate an exemplary embodiment of a compression fitting. As shown, the compression fitting includes a fitting body 100 and a ferrule 110. A tube 120 can be disposed through the fitting body 100 and the ferrule 110. The ferrule 110 can be used to provide a fluidic seal between the tube 120 and the walls of a cavity in which the compression fitting is disposed.

In the illustrated embodiment of FIGS. 1A-1D, the fitting body 100 has a first end 101, a second and 103, and an inner surface 107. The inner surface 107 extends from the first end 101 to the second end 103 and defines a passageway 109 through the fitting body 100. The passageway 109 can be configured and sized to receive tubing, e.g., a tube 120. For example, the inner diameter of the passageway 109 can be configured and sized to receive tubing having an outer diameter of about 1/16th of an inch, i.e., tubing having an outer diameter of about 0.0625 inches (about 1.5875 mm). In some embodiments, the inner diameter of the passageway 109 can be in the range of about 0.064 inches (about 1.6256 mm) to about 0.068 inches (about 1.7272 mm), e.g., about 0.067 inches (about 1.7018 mm). The second end 103 of the fitting body 100 can include an inner circumferential recess 102.

Figure 1C:
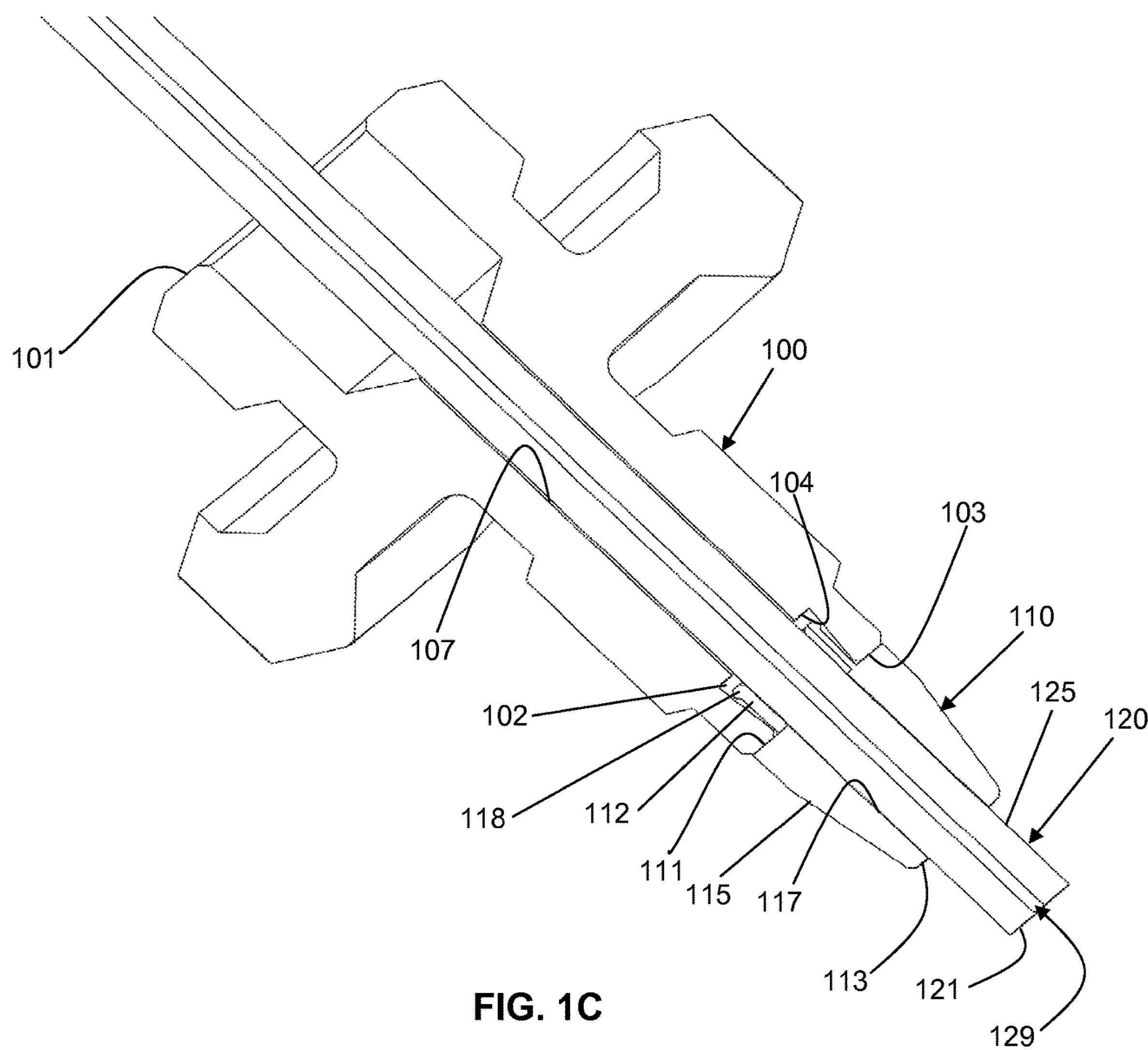
FIG. 1C is a sectional view of the fitting body, ferrule, and tube of FIG. 1A.
Figure 1D:
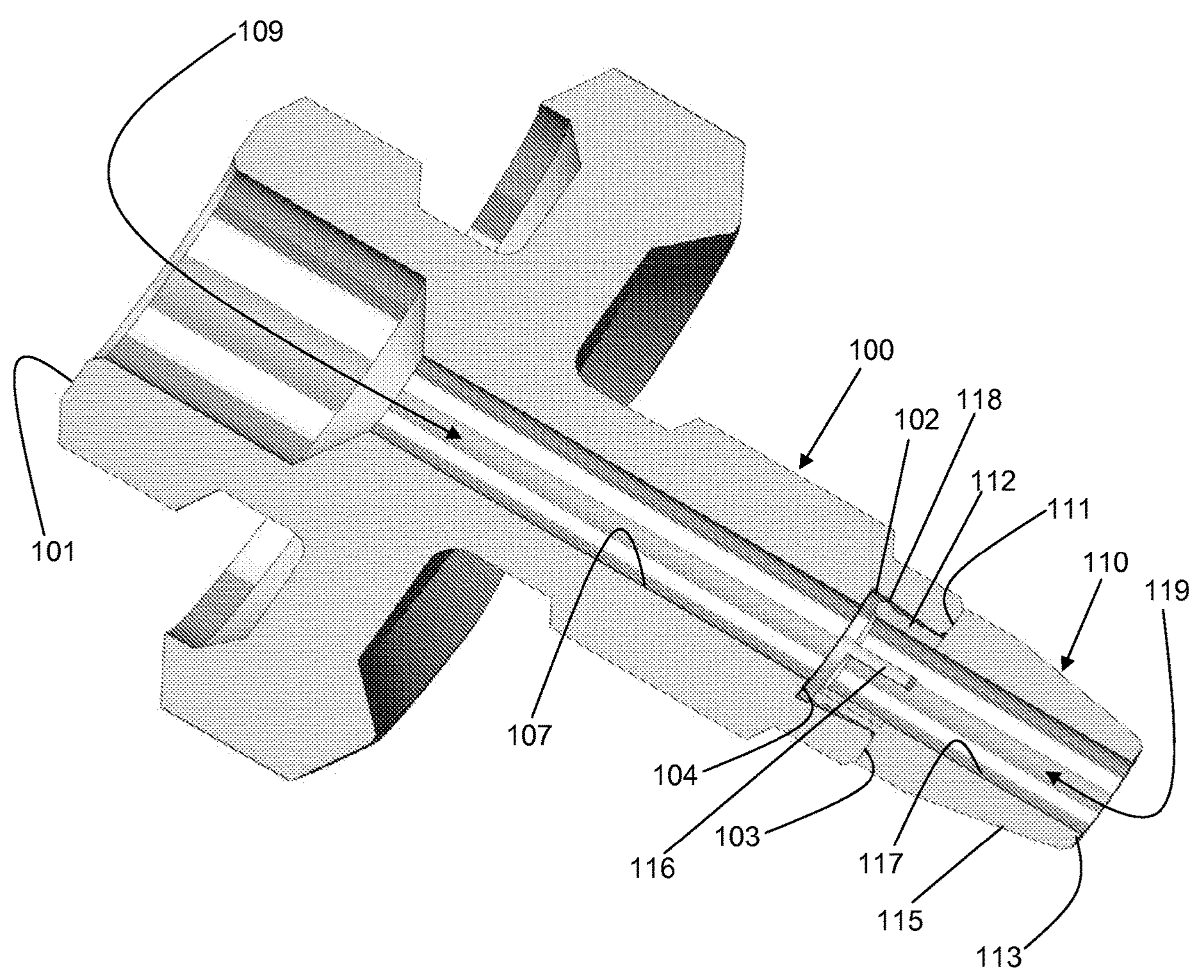
FIG. 1D is a sectional view of the fitting body and ferrule of FIG. 1A.

The inner circumferential recess 102 can extend from the outer surface of the second end 103 along the passageway through the fitting body to a shoulder surface 104. The inner circumferential recess 102 can be configured to receive the coupling extension 112 of the ferrule 110, e.g., as illustrated in FIGS. 1C and 1D and discussed in more detail below. In some embodiments, the inner circumferential recess 102 can have a tapered surface. For example, the diameter of the recess 102 at the second end 103 of the fitting body can be smaller than the diameter of the recess 102 at, or near, the intersection between the surface of the inner circumferential recess 102 and the shoulder surface 104.

In the illustrated embodiment of FIGS. 1A-1D, the ferrule 110 has a first end 111, a second end 113, an outer surface 115, and an inner surface 117. The inner surface 117 extends from the first end 111 to the second end 113 and defines a passageway 119 through the ferrule from the first end to the second end. The passageway 119 can be configured and sized to receive tubing, e.g., a tube 120. For example, the inner diameter of the passageway 119 can be configured and sized to receive tubing having an outer diameter of about 1/16th of an inch, i.e., tubing having an outer diameter of about 0.0625 inches (about 1.5875 mm). In some embodiments, the inner diameter of the passageway 119 can be in the range of about 0.064 inches (about 1.6256 mm) to about 0.068 inches (about 1.7272 mm) e.g., about 0.064 inches (about 1.6256 mm).

At least a portion of the outer surface 115 of the ferrule 110 can be angled relative to a centerline axis of the ferrule. For example, a portion of the outer surface 115 of the ferrule 110 can be wedge-shaped. In some embodiments, a portion of the outer surface 115 of the ferrule 110 can be frustoconical. The wedge-shaped or frustoconical portion of the outer surface 115 of the ferrule 110 is configured to engage a corresponding surface in a receiving body. In exemplary embodiments, the wedge-shaped or frustoconical portion of the outer surface 115 of the ferrule 110 can be angled from the centerline axis at an angle in the range of about 10 degrees to about 20 degrees, i.e., about 20 degrees included to about 40 degrees included. In some embodiments, the wedge-shaped or frustoconical portion of the outer surface 115 of the ferrule 110 can be angled from the centerline axis at an angle of about 10.5 degrees or about 11 degrees, i.e., about 21 degrees or about 22 degrees included.

As shown in FIGS. 1A-1D, the ferrule 110 can include a coupling extension 112. In the illustrated embodiment, the coupling extension 112 includes a plurality of coupling members 114 separated from each other by a plurality of slots 116. In other embodiments, the coupling extension 112 can be a single continuous collar. The coupling extension 112, e.g., the coupling members 114, can be flexible. For example, the coupling extension 112 can be sufficiently deformable to allow the coupling extension to be inserted into the inner circumferential recess 102 of the fitting body 100, as discussed in more detail below. In embodiments having slots 116 between the coupling members 114, the slots 116 can allow the coupling members 114 to flex towards the interior of the passageway 119 to allow the coupling extension 112 to be inserted into the inner circumferential recess 102 of the fitting body 100. The coupling extension 112 can have any length. In an exemplary embodiment, the coupling extension 112 can have a length equal to or less than the depth of the inner circumferential recess 102, i.e., the distance between the second end 103 of the fitting body 100 and the shoulder surface 104 can be greater than or equal to the length of the coupling extension 112. When the coupling extension 112 is inserted into the inner circumferential recess 102, the first end 111 of the ferrule 110 can contact the second end 103 of the fitting body 100, e.g., as shown in FIGS. 1C and 1D.

The coupling extension 112 can also include a surface feature, e.g., a projection 118. The projection 118 can be a portion of an end of the coupling extension 112. For example, each of the plurality of coupling members 114 can have a projection 118. The projection 118 can have any shape. In some embodiments, the projection can have a generally triangular shape extending from the coupling extension 112. The projection 118 can extend radially outward from the coupling extension, e.g., the outer diameter of the coupling extension 112 at the projection 118 can be greater than the diameter of the coupling extension 112 at the intersection between the coupling extension 112 and the first end 111 of the ferrule 110. For example, the outer diameter of the coupling extension 112 at the projection 118 can be greater than the inner diameter of the fitting body 100 at its second end 103. The engagement between the coupling extension 112 and the inner circumferential recess 102 of the fitting body 100 couples the ferrule 110 to the fitting body 100. For example, there can be an interference fit or a frictional fit, or both, between the coupling extension 112 of the ferrule 110 and the inner circumferential recess 102 of the fitting body 100. In some embodiments, the outer diameter of the coupling extension 112 at the projection 118 can be less than the inner diameter of the inner circumferential recess 102 at, or near, the shoulder surface 104 such that the coupling extension, e.g., the projection, does not contact the surface of the inner circumferential recess when the ferrule is inserted into the fitting body, e.g., when the first end 111 of the ferrule 110 is in contact with the second end 103 of the fitting body 100.

As noted above, the fitting body 100 and the ferrule 110 are, in exemplary embodiments, configured and sized to receive tubing through the respective passageways 109 and 119. An exemplary tube 120 includes an outer surface 125, an end 121, and an internal fluid conduit 129. The end 121 of the tube 120 can be configured to abut a conduit in a receiving body. The outer surface 125 of the tube 120 can have a diameter selected to fit through the passageways 109, 119 of the fitting body 100 and the ferrule 110. The diameter of the tube 120 can be selected to closely fit within the passageways 109, 119. However, both the ferrule 110 and the body 100 can be freely rotatable on the tube 120. In exemplary embodiments, the tube can prevent the ferrule from being removed from the fitting body when the tube is inserted through the respective passageways of the fitting body and ferrule. For example, interference between the tube and the coupling extension can prevent the coupling extension from flexing inwards, thereby preventing the ferule from being removed from the fitting body.

Figure 1E:
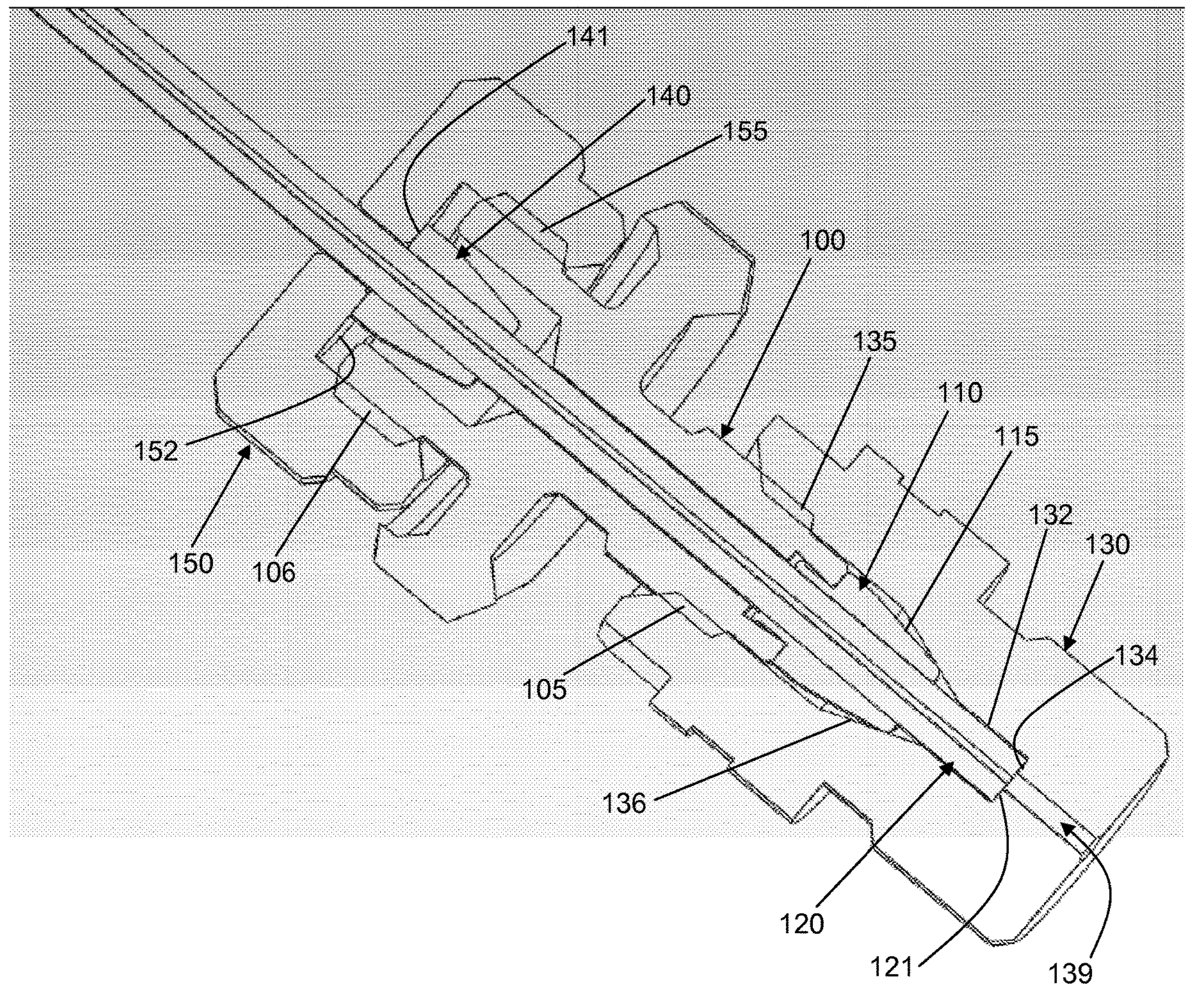
FIG. 1E is a sectional view of the fitting body, ferrule, and tube of FIG. 1A disposed in a receiving body according to an embodiment of the invention.

FIG. 1E illustrates the compression fitting of FIGS. 1A-1D installed within a receiving body 130. The receiving body 130 includes a cylindrical region 132. The cylindrical region 132 is configured to receive the tube 120. The fitting body 100 can include a first threaded region 105 that cooperates with a corresponding threaded region 135 formed on an inner surface of the receiving body 130. As the fitting body is rotated and advances along the threads of the threaded regions, the ferrule 110 can be driven against an inner surface 136 of the receiving body to form a seal between the inner surface 136 and the outer surface 115 of the ferrule 110, as well as between the inner surface 117 of the ferrule 110 and the tube 120.

In the embodiment shown in FIG. 1E, the tube 120 can include a rear ferrule 140. The rear ferrule is attached to the tube 120, e.g., by swaging. A first end 141 of the rear ferrule 140 can contact an inner surface 152 of a rear nut 150. The rear nut 150 can retain the rear ferrule 140 and the attached tube 120 within the fitting body 100. The rear nut 150 includes a threaded region 155 that cooperates with a second threaded region 106 formed on an outer surface of the fitting body 100. As the rear nut is rotated and advances along the threads of the threaded regions, contact between the inner surface 152 of the rear nut 150 and the first end 141 of the rear ferrule 140 can drive the end 121 of the attached tube 120 against a forward shoulder surface 134 of the receiving body 130. When the end 121 of the tube 120 contacts the forward shoulder surface 134 of the receiving body, the internal fluid conduit 129 of the tube is in fluid communication with a passageway 139 of the receiving body 130.

FIGS. 2A-2D illustrate another exemplary embodiment of a compression fitting. As shown, the compression fitting includes a fitting body 200 and a ferrule 210. A tube 220 can be disposed through the fitting body 200 and the ferrule 210. The ferrule 210 can be used to provide a fluidic seal between the tube 220 and the walls of a cavity in which the compression fitting is disposed. As discussed above with respect to FIG. 1E, various surfaces of the fitting body 200 can include threads to allow the fitting body to engage with a rear nut and receiving body similar to those shown in FIG. 1E.

In the illustrated embodiment of FIGS. 2A-2D, the fitting body 200 has a first end 201, a second and 203, and an inner surface 207. The inner surface 207 extends from the first end 201 to the second end 203 and defines a passageway 209 through the fitting body 200. The passageway 209 can be configured and sized to receive tubing, e.g., a tube 220. For example, the inner diameter of the passageway 209 can be configured and sized to receive tubing having an outer diameter of about 1/16th of an inch, i.e., tubing having an outer diameter of about 0.0625 inches (about 1.5875 mm). In some embodiments, the inner diameter of the passageway 209 can be in the range of about 0.064 inches (about 1.6256 mm) to about 0.068 inches (about 1.7272 mm), e.g., about 0.067 inches (about 1.7018 mm).

Figure 2A:
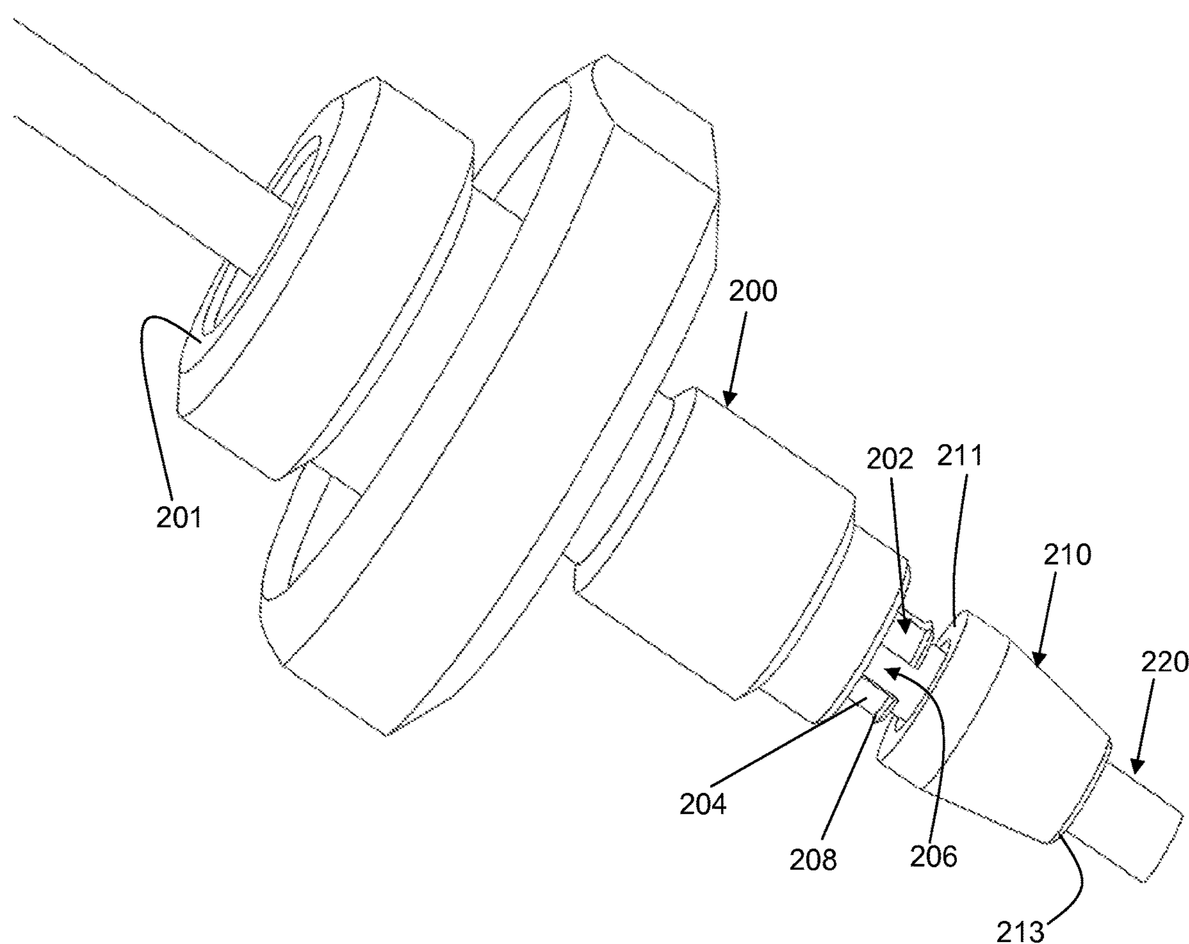
FIG. 2A is an isometric view of a fitting body, ferrule, and tube according to another embodiment of the invention.
Figure 2B:
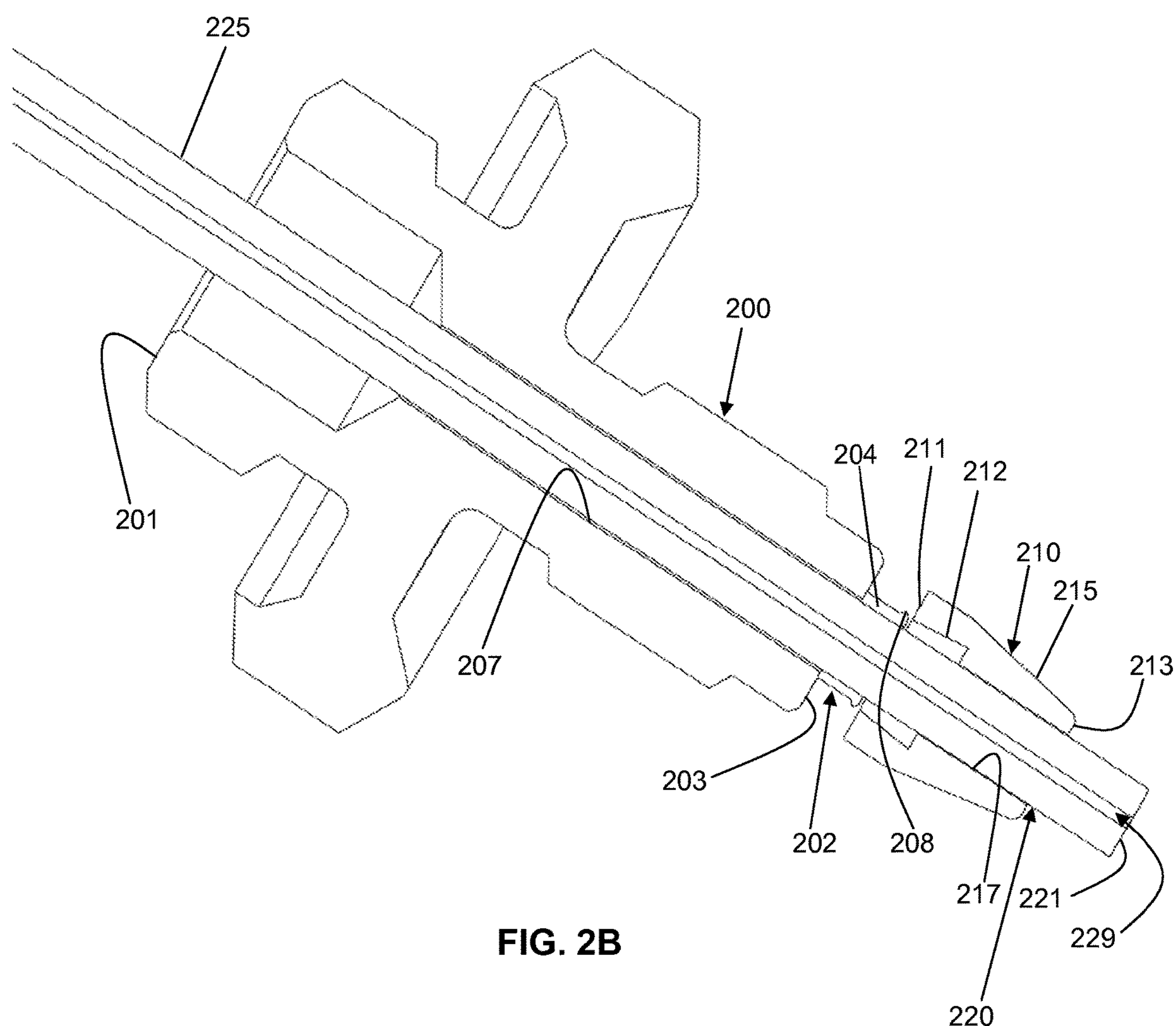
FIG. 2B is a sectional view of the fitting body, ferrule, and tube of FIG. 2A.
Figure 2C:
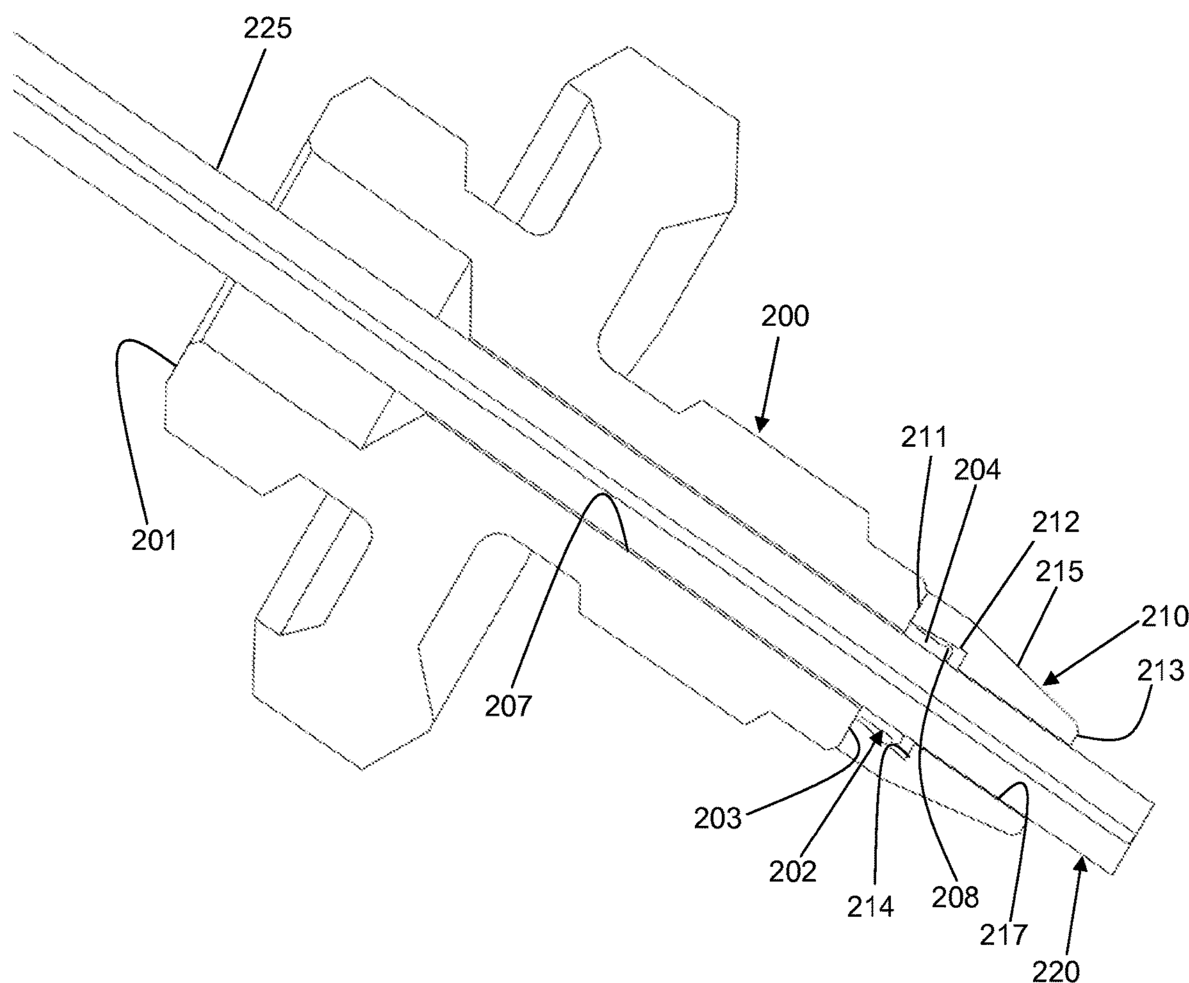
FIG. 2C is a sectional view of the fitting body, ferrule, and tube of FIG. 2A.
Figure 2D:
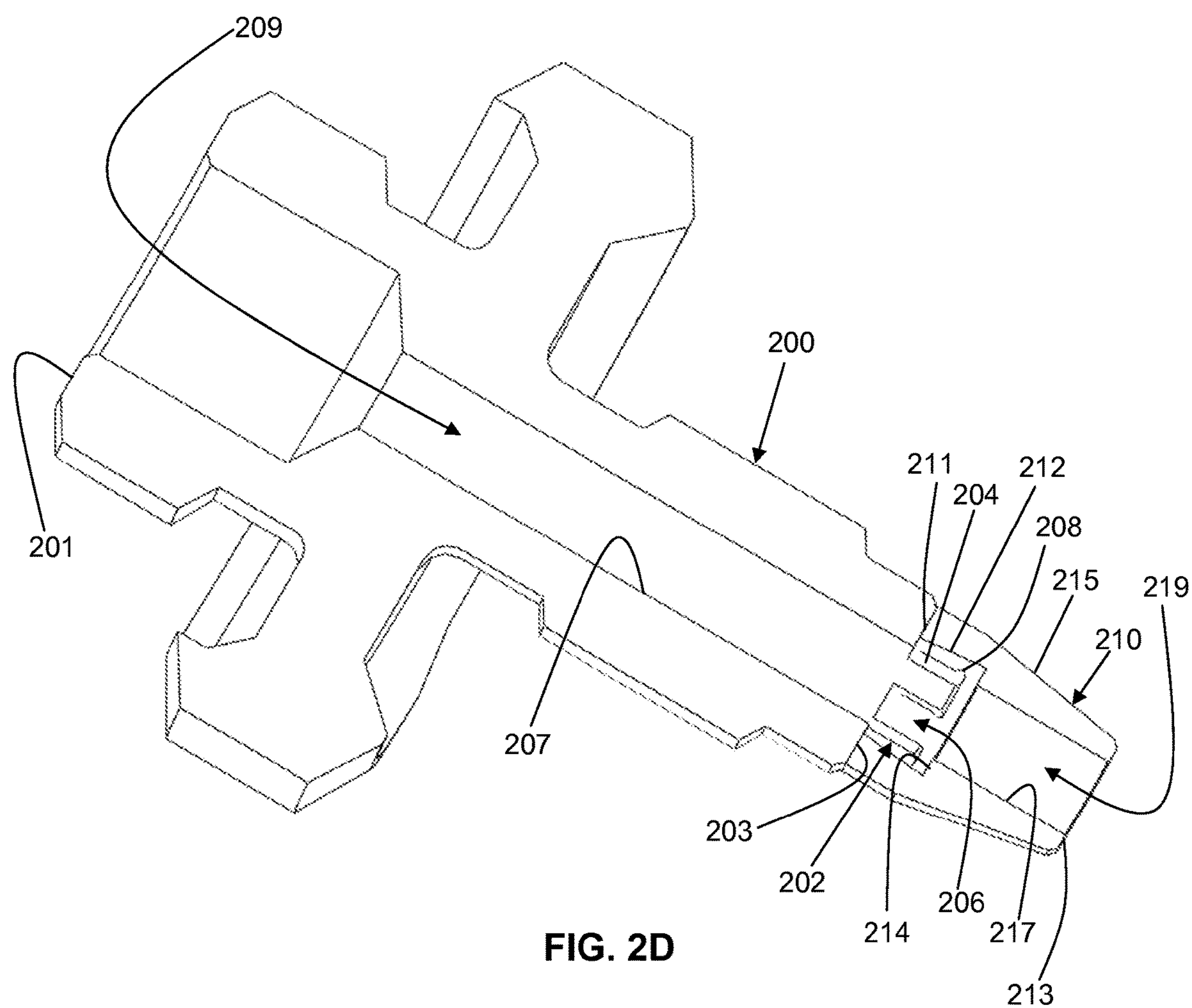
FIG. 2D is a sectional view of the fitting body and ferrule of FIG. 2A.

As shown in FIGS. 2A-2D, the fitting body 200 can include a coupling extension 202. In the illustrated embodiment, the coupling extension 202 includes a plurality of coupling members 204 separated from each other by a plurality of slots 206. In other embodiments, the coupling extension 202 can be a single continuous collar. The coupling extension 202, e.g., the coupling members 204, can be flexible. For example, the coupling extension 202 can be sufficiently deformable to allow the coupling extension to be inserted into the inner circumferential recess 212 of the ferrule 210, as discussed in more detail below. In embodiments having slots 206 between the coupling members 204, the slots 206 can allow the coupling members 204 to flex towards the interior of the passageway 209 to allow the coupling extension 202 to be inserted into the inner circumferential recess 212 of the ferrule 210. The coupling extension 202 can have any length. In an exemplary embodiment, the coupling extension 202 can have a length equal to or less than the depth of the inner circumferential recess 212, i.e., the distance between the second end 211 of the ferrule 210 and the shoulder surface 214 can be greater than or equal to the length of the coupling extension 202. When the coupling extension 202 is inserted into the inner circumferential recess 212, the second end 211 of the ferrule 210 can contact the first end 203 of the fitting body 200, e.g., as shown in FIGS. 2C and 2D.

The coupling extension 202 can also include a surface feature, e.g., a projection 208. The projection 208 can be a portion of an end of the coupling extension 202. For example, each of the plurality of coupling members 204 can have a projection 208. The projection 208 can have any shape. In some embodiments, the projection 208 can have a generally triangular shape extending from the coupling extension 202. The outer diameter of the coupling extension 202 at the projection 208 can be greater than the diameter of the coupling extension 202 at the intersection between the coupling extension 202 and the first end 203 of the fitting body 200. For example, the outer diameter of the coupling extension 202 at the projection 208 can be greater than the inner diameter of the ferrule 210 at its second end 211. The engagement between the coupling extension 202 and the inner circumferential recess 212 of the ferrule 210 couples the ferrule 210 to the fitting body 200. For example, there can be an interference fit or a frictional fit, or both, between the inner circumferential recess 212 of the ferrule 210 and the coupling extension 202 of the fitting body 200. In some embodiments, the outer diameter of the coupling extension 202 at the projection 208 can be less than the inner diameter of the inner circumferential recess 212 at, or near, the shoulder surface 214 such that the coupling extension, e.g., the projection, does not contact the surface of the inner circumferential recess when the ferrule is inserted onto the coupling extension of the fitting body, e.g., when the first end 211 of the ferrule 210 is in contact with the second end 203 of the fitting body 200.

As noted above, the fitting body 200 and the ferrule 210 are, in exemplary embodiments, configured and sized to receive tubing through the respective passageways 209 and 219. An exemplary tube 220 includes an outer surface 225, an end 221, and an internal fluid conduit 229. The end 221 of the tube 220 can be configured to abut a passageway in a receiving body, e.g., as discussed above with respect to FIG. 1E. The outer surface 225 of the tube 220 can have a diameter selected to fit through the passageways 209, 219 of the fitting body 200 and the ferrule 210. The diameter of the tube 220 can be selected to closely fit within the passageways 209, 219. However, both the ferrule 210 and the body 200 can be freely rotatable on the tube 220. In exemplary embodiments, the tube can prevent the ferrule from being removed from the fitting body when the tube is inserted through the respective passageways of the fitting body and ferrule. For example, interference between the tube and the coupling extension can prevent the coupling extension from flexing inwards, thereby preventing the ferule from being removed from the fitting body.

Figure 3A:
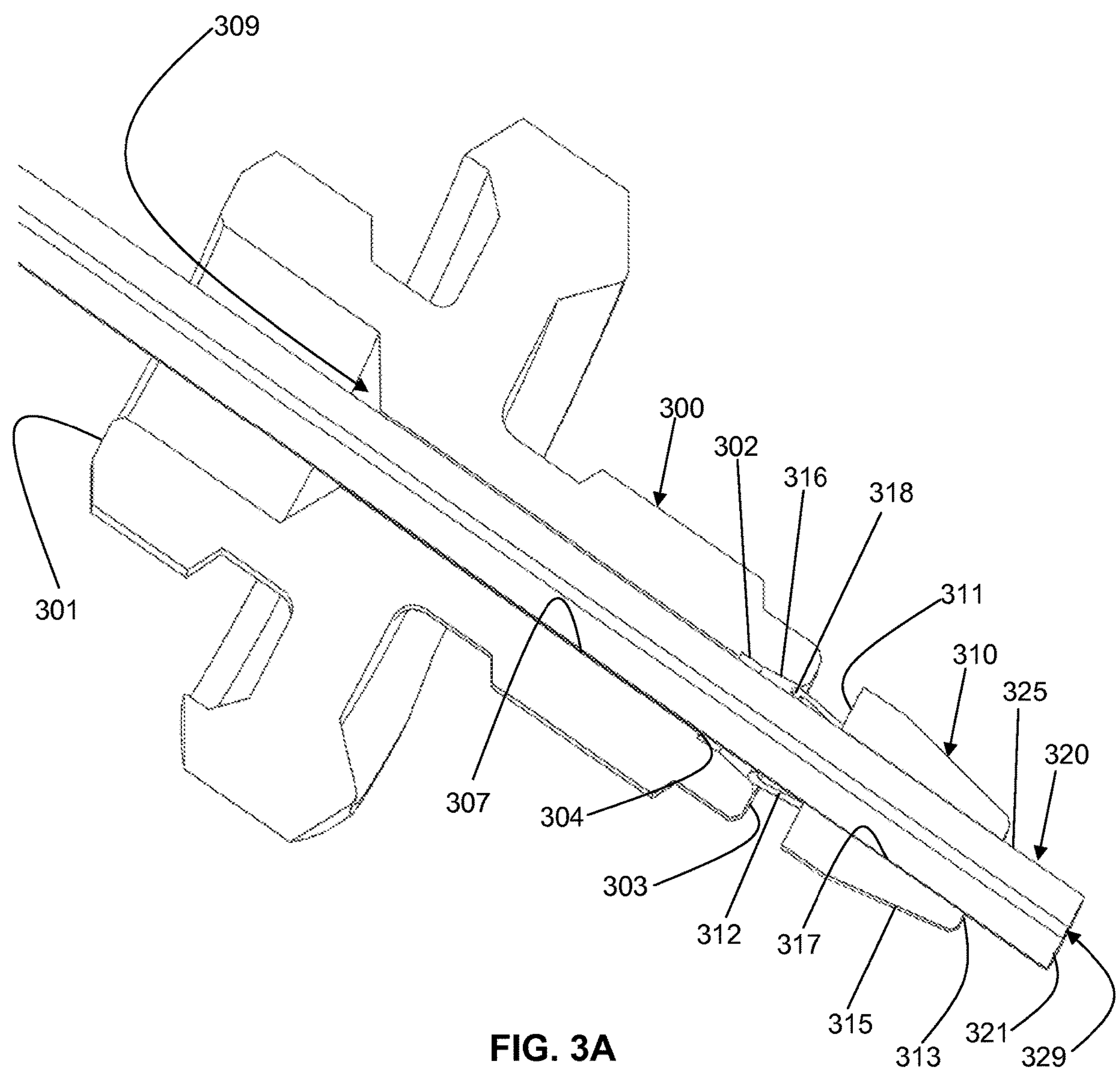
FIG. 3A is a sectional view of a fitting body, ferrule, and tube according to another embodiment of the invention.
Figure 3B:
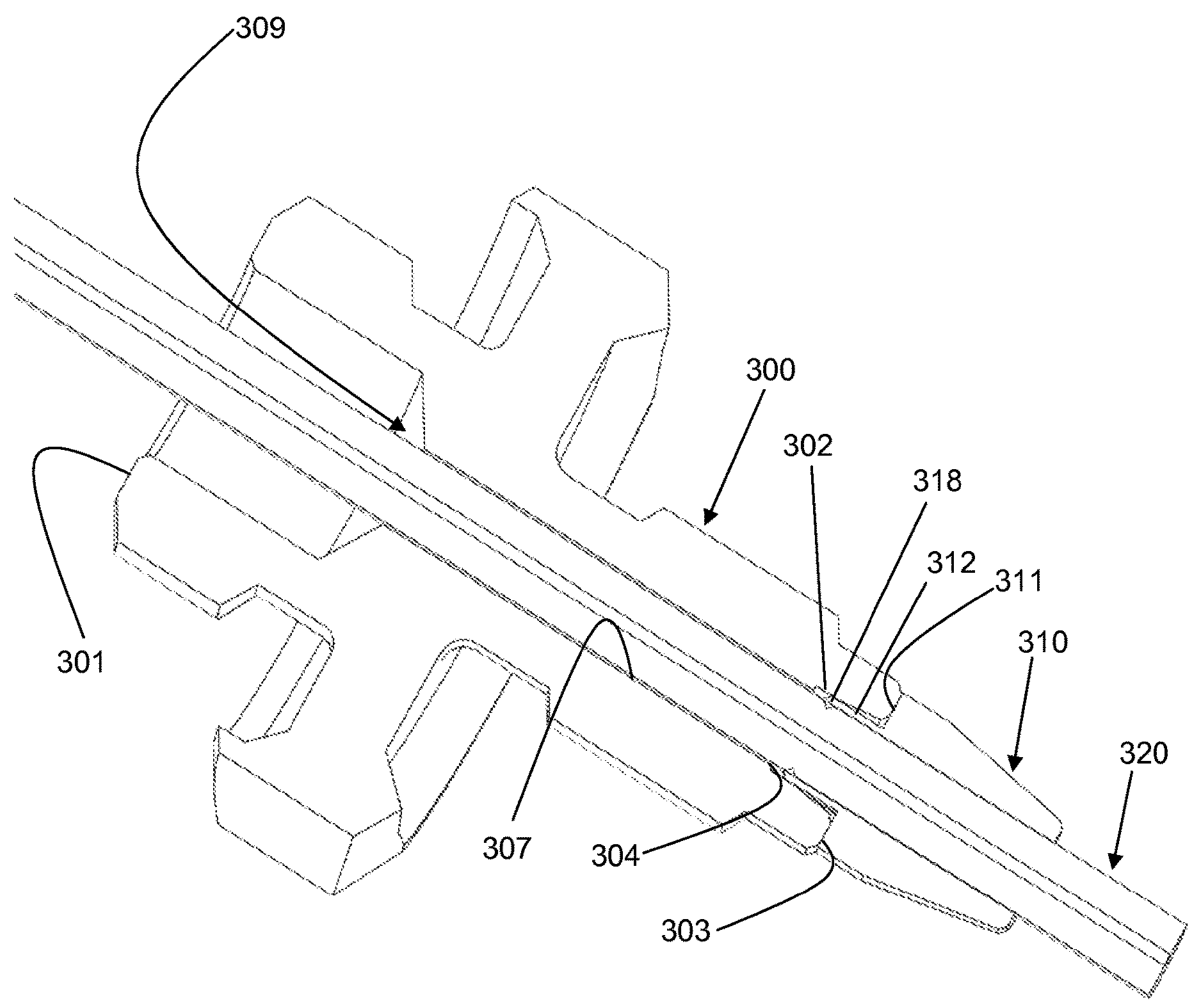
FIG. 3B is a sectional view of the fitting body, ferrule, and tube of FIG. 3A.

FIGS. 3A-3B illustrate another exemplary embodiment of a compression fitting. As shown, the compression fitting includes a fitting body 300 and a ferrule 310. A tube 320 can be disposed through the fitting body 300 and the ferrule 310. The ferrule 310 can be used to provide a fluidic seal between the tube 320 and the walls of a cavity in which the compression fitting is disposed. As discussed above with respect to FIG. 1E, various surfaces of the fitting body 300 can include threads to allow the fitting body to engage with a rear nut and receiving body similar to those shown in FIG. 1E.

In the illustrated embodiment of FIGS. 3A-3B, the fitting body 300 has a first end 301, a second and 303, and an inner surface 307. The inner surface 307 extends from the first end 301 to the second end 303 and defines a passageway 309 through the fitting body 300. The passageway 309 can be configured and sized to receive tubing, e.g., a tube 320. For example, the inner diameter of the passageway 309 can be about be configured and sized to receive tubing having an outer diameter of about 1/16th of an inch, i.e., tubing having an outer diameter of about 0.0625 inches (about 1.5875 mm). In some embodiments, the inner diameter of the passageway 309 can be in the range of about 0.064 inches (about 1.6256 mm) to about 0.068 inches (about 1.7272 mm), e.g., about 0.067 inches (about 1.7018 mm). The second end 303 of the fitting body 300 can include an inner circumferential recess 302.

The inner circumferential recess 302 can extend from the outer surface of the second end 303 along the passageway through the fitting body to a shoulder surface 304. The inner circumferential recess 302 can be configured to receive the coupling extension 312 of the ferrule 310, e.g., as illustrated in FIGS. 3A and 3B and discussed in more detail below. For example, the diameter of the recess 302 at the second end 303 of the fitting body can be larger than the diameter of the recess 302 at, or near, the intersection between the surface of the inner circumferential recess 302 and the shoulder surface 304. The shape of the inner circumferential recess 302 can be configured to retain the coupling extension 312 of the ferrule 310 when the tube 320 is disposed through the passageway 309. For example, there can be an interference fit or a frictional fit between the tube 320 and the coupling extension 312. In some embodiments, a portion of the inner circumferential recess 302 can be tapered, e.g., the inner circumferential recess 302 can include a tapered wall portion 316. The inner circumferential recess 302 can also include a cylindrical wall portion, e.g., between the tapered wall portion 316 and the shoulder surface 304.

In the illustrated embodiment of FIGS. 3A-3B, the ferrule 310 has a first end 311, a second end 313, an outer surface 315, and an inner surface 317. The inner surface 317 extends from the first end 311 to the second end 313 and defines a passageway through the ferrule from the first end to the second end. The passageway can be configured and sized to receive tubing, e.g., a tube 320. For example, the inner diameter of the passageway can be about configured and sized to receive tubing having an outer diameter of about 1/16th of an inch, i.e., tubing having an outer diameter of about 0.0625 inches (about 1.5875 mm). In some embodiments, the inner diameter of the passageway 119 can be in the range of about 0.064 inches (about 1.6256 mm) to about 0.068 inches (about 1.7272 mm), e.g., about 0.064 inches (about 1.6256 mm).

At least a portion of the outer surface 315 of the ferrule 310 can be angled relative to a centerline axis of the ferrule. For example, a portion of the outer surface 315 of the ferrule 310 can be wedge-shaped. In some embodiments, a portion of the outer surface 315 of the ferrule 310 can be frustoconical. The wedge-shaped or frustoconical portion of the outer surface 315 of the ferrule 310 is configured to engage a corresponding surface in a receiving body. In exemplary embodiments, the wedge-shaped or frustoconical portion of the outer surface 315 of the ferrule 310 can be angled from the centerline axis at an angle in the range of about 10 degrees to about 20 degrees, i.e., about 20 degrees included to about 40 degrees included. In some embodiments, the wedge-shaped or frustoconical portion of the outer surface 315 of the ferrule angled from the centerline axis at an angle of about 10.5 degrees or 11 degrees, i.e., about 21 degrees or about 22 degrees included.

As shown in FIGS. 3A-3B, the ferrule 310 can include a coupling extension 312. The coupling extension 312 can include a plurality of coupling members separated from each other by a plurality of slots. In other embodiments, the coupling extension 312 can be a single continuous collar. The coupling extension 312, e.g., the coupling members, can be flexible. For example, the coupling extension 312 can be sufficiently deformable to allow the tube 320 to be inserted through the ferrule 310. In embodiments having slots between the coupling members 314, the slots can allow the coupling members to flex apart to allow the tube 320 to pass through the ferrule 310.

The coupling extension 312 can have any length. In an exemplary embodiment, the coupling extension 312 can have a length equal to or less than the depth of the inner circumferential recess 302, i.e., the distance between the second end 303 of the fitting body 300 and the shoulder surface 304 can be greater than or equal to the length of the coupling extension 312. When the coupling extension 312 is inserted into the inner circumferential recess 302, the first end 311 of the ferrule 310 can contact the second end 303 of the fitting body 300, e.g., as shown in FIG. 3B.

The coupling extension 312 can also include a surface feature, e.g., a projection 318. The projection 318 can be a portion of an end of the coupling extension 312. For example, each of the plurality of coupling members can have a projection 318. The projection 318 can have any shape. In some embodiments, the projection can have a generally triangular shape extending from the coupling extension 312. The projection 318 can extend radially inward from the coupling extension, e.g., the inner diameter of the coupling extension 312 at the projection 318 can be less than the inner diameter of the coupling extension 312 at the intersection between the coupling extension 312 and the first end 311 of the ferrule 310. For example, the inner diameter of the coupling extension 312 at the projection 318 can be less than the outer diameter of the tube 320 such that the coupling extension 312 flexes outward when the tube 320 is disposed through the ferrule 310. The projection 318 of the coupling extension can frictionally engage the outer surface 325 of the tube. Contact between the projection 318 and the outer surface 325 of the tube 320 can provide a frictional engagement therebetween that can prevent the ferrule from sliding off the tube.

In some embodiments, the projection 318 can be deformed against an outer surface of the tube 320 when the coupling extension 312 is inserted into the inner circumferential recess 302, e.g., as shown in FIG. 3B, forming a frictional engagement between the ferrule and the tube and/or between the ferrule and the fitting body. The engagement between the projection 318 and the outer surface of the tube 320 retains the ferrule 310 on the tube 320.

As noted above, the fitting body 300 and the ferrule 310 are, in exemplary embodiments, configured and sized to receive tubing through their respective passageways. An exemplary tube 320 includes an outer surface 325, an end 321, and an internal fluid conduit 329. The end 321 of the tube 320 can be configured to abut a passageway in a receiving body, e.g., as discussed above with respect to FIG. 1E. The outer surface 325 of the tube 320 can have a diameter selected to fit through the passageways of the fitting body 300 and the ferrule 310. The diameter of the tube 320 can be selected to closely fit within the passageways. However, the body 300 can be freely rotatable on the tube 320.

Figure 4A:
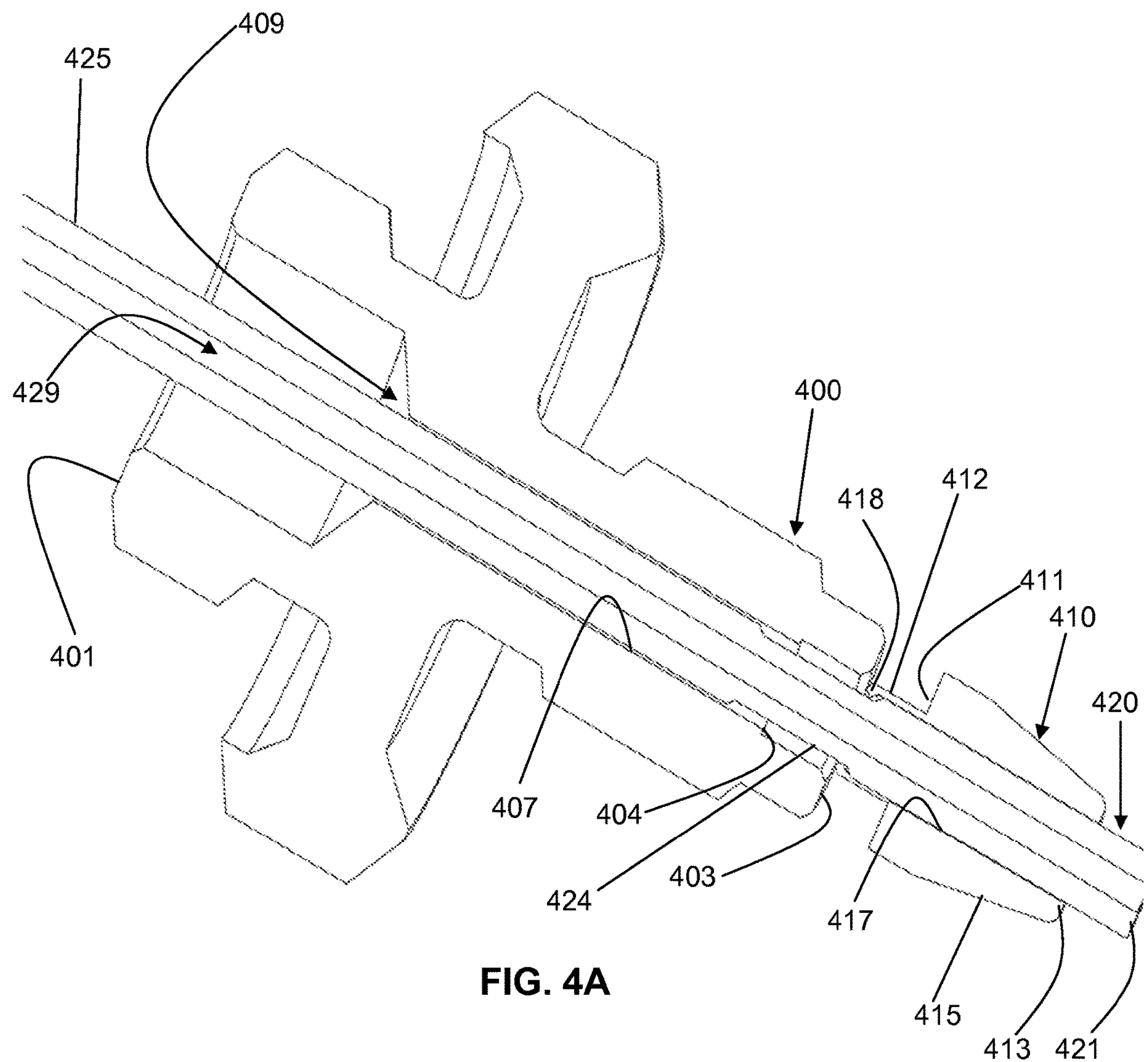
FIG. 4A is a sectional view of a fitting body, ferrule, and tube according to another embodiment of the invention.
Figure 4B:
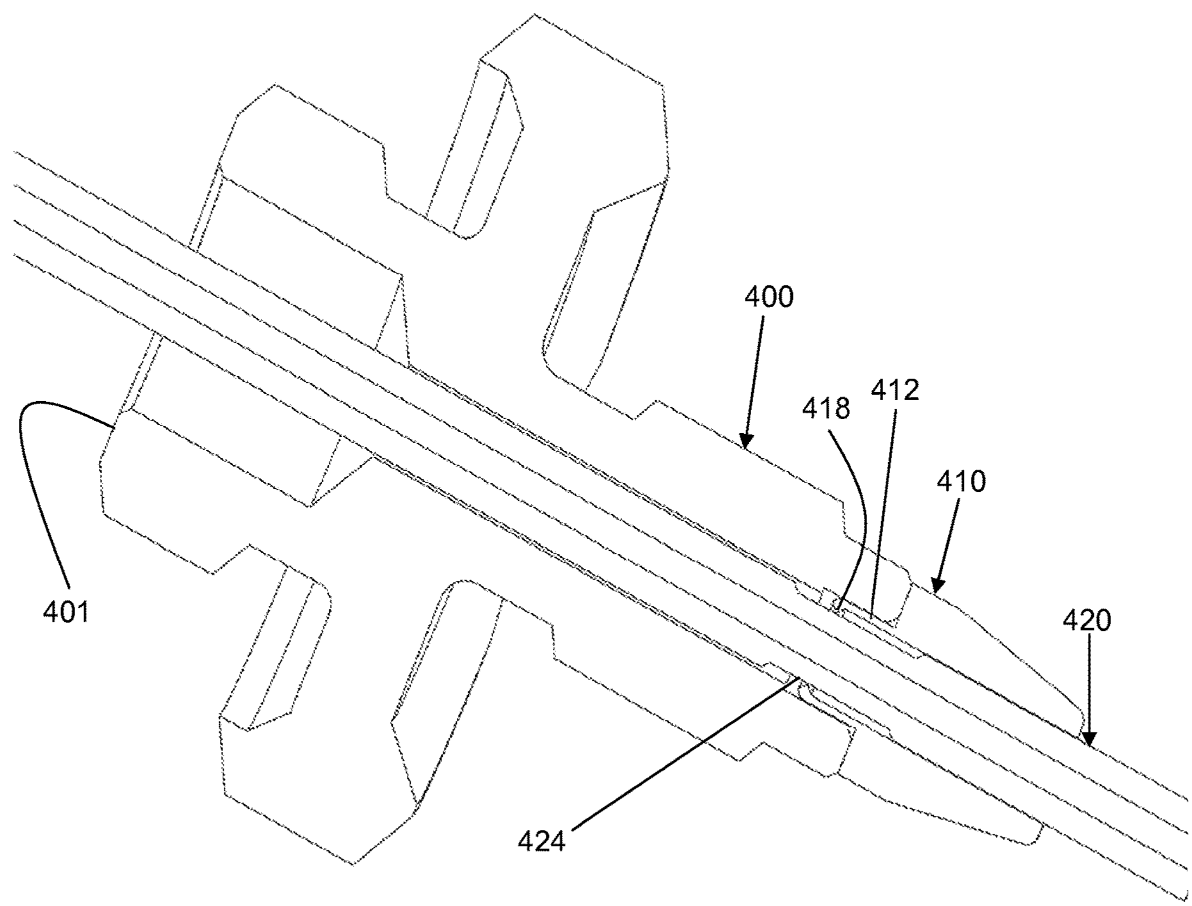
FIG. 4B is a sectional view of the fitting body, ferrule, and tube of FIG. 4A.

FIGS. 4A-4B illustrate a further exemplary embodiment of a compression fitting. As shown, the compression fitting includes a fitting body 400 and a ferrule 410. A tube 420 can be disposed through the fitting body 400 and the ferrule 410.

The ferrule 410 can be used to provide a fluidic seal between the tube 420 and the walls of a cavity in which the compression fitting is disposed. As discussed above with respect to FIG. 1E, various surfaces of the fitting body 400 can include threads to allow the fitting body to engage with a rear nut and receiving body similar to those shown in FIG. 1E.

In the illustrated embodiment of FIGS. 4A-4B, the fitting body 400 has a first end 401, a second and 403, and an inner surface 407. The inner surface 407 extends from the first end 401 to the second end 403 and defines a passageway 409 through the fitting body 400. The passageway 409 can be configured and sized to receive tubing, e.g., a tube 420. For example, the inner diameter of the passageway 409 can be configured and sized to receive tubing having an outer diameter of about 1⁄16th of an inch, i.e., tubing having an outer diameter of about 0.0625 inches (about 1.5875 mm). In some embodiments, the inner diameter of the passageway 109 can be in the range of about 0.064 inches (about 1.6256 mm) to about 0.068 inches (about 1.7272 mm), e.g., about 0.067 inches (about 1.7018 mm).

An exemplary tube 420 includes an outer surface 425, an end 421, and an internal fluid conduit 429. The end 421 of the tube 420 can be configured to abut a passageway in a receiving body, e.g., as discussed above with respect to FIG. 1E. The outer surface 425 of the tube 420 can have a nominal diameter selected to fit through the passageways of the fitting body 400 and the ferrule 410. The nominal diameter of the tube 420 can be selected to closely fit within the passageways. However, the body 400 can be freely rotatable on the tube 420.

The tube 420 can include an outer circumferential cutout region 424. The cutout region 424 can extend circumferentially around the outer circumference of the tube 420. In some embodiments, the cutout region 424 is a region having a smaller outer diameter than the nominal outer diameter of the tube 420. In other embodiments, the cutout region 424 includes a plurality of cutout portions distributed around the outer circumference of the tube 420. For example, the outer diameter of the tube 420 in the cutout region can be about 10 percent less than the nominal outer diameter of the tube. In other examples, the outer diameter of the tube in the cutout region can be in the range of about 10 percent to about 25 percent less than the nominal outer diameter of the tube. In exemplary embodiments, the depth of the cutout region, or the depth of the plurality of cutout portions, is selected to accommodate a projection 418 of a coupling extension 412 extending from the ferrule 410, discussed in more detail below.

The cutout region 424 extends along the length of the tube 420 for a distance that can be selected to allow for adjustment of the length of tube extending from the ferrule 410. The cutout region 424 can have any length and can extend along the tube 420 for any distance. For example, the length of the cutout region can be configured and sized to receive a projection 418 of a coupling extension 412 the ferrule 410, discussed in more detail below, while allowing for adjustment to the length of tube extending from the ferrule 410. In some embodiments, the length of the cutout region can be in the range of about 0.10 inches to about 0.15 inches about, for example about 0.110 inches.

The second end 403 of the fitting body 400 can include an inner circumferential recess 402. The inner circumferential recess 402 can extend from the outer surface of the second end 403 along the passageway through the fitting body to a shoulder surface 404. The inner circumferential recess 402 can be configured to receive the coupling extension 412 of the ferrule 410, e.g., as illustrated in FIGS. 4A and 4B and discussed in more detail below. For example, the inner circumferential recess 402 can include a cylindrical wall, e.g., between the second end 403 to a shoulder surface 404. The shape and size of the inner circumferential recess 402 can be configured to retain the coupling extension 412 of the ferrule 410 when the tube 420 is disposed through the passageway 409. For example, there can be an interference fit or frictional fit between the tube 420 and the coupling extension 412, as discussed in more detail below.

In the illustrated embodiment of FIGS. 4A-4B, the ferrule 410 has a first end 411, a second end 413, an outer surface 415, and an inner surface 417. The inner surface 417 extends from the first end 411 to the second end 413 and defines a passageway through the ferrule from the first end to the second end. The passageway can be configured and sized to receive tubing, e.g., a tube 420. For example, the inner diameter of the passageway can be configured and sized to receive tubing having an outer diameter of about 1⁄16th of an inch, i.e., tubing having an outer diameter of about 0.0625 inches (about 1.5875 mm). In some embodiments, the inner diameter of the passageway 419 can be in the range of about 0.064 inches (about 1.6256 mm) to about 0.068 inches (about 1.7272 mm) e.g., about 0.064 inches (about 1.6256 mm).

At least a portion of the outer surface 415 of the ferrule 410 can be angled relative to a centerline axis of the ferrule. For example, a portion of the outer surface 415 of the ferrule 410 can be wedge-shaped. In some embodiments, a portion of the outer surface 415 of the ferrule 410 can be frustoconical. The wedge-shaped or frustoconical portion of the outer surface 415 of the ferrule 410 is configured to engage a corresponding surface in a receiving body. In exemplary embodiments, the wedge-shaped or frustoconical portion of the outer surface 415 of the ferrule 410 can be angled from the centerline axis at an angle in the range of about 10 degrees to about 20 degrees, i.e., about 20 degrees included to about 40 degrees included. In some embodiments, the wedge-shaped or frustoconical portion of the outer surface 415 of the ferrule 410 can be angled from the centerline axis at an angle of about 10.5 degrees or about 11 degrees, i.e., about 21 degrees or about 22 degrees included.

As shown in FIGS. 4A-4B, the ferrule 410 can include a coupling extension 412. The coupling extension 412 can include a plurality of coupling members separated from each other by a plurality of slots. In other embodiments, the coupling extension 412 can be a single continuous collar. The coupling extension 412, e.g., the coupling members, can be flexible. For example, the coupling extension 412 can be sufficiently deformable to allow the tube 420 to be inserted through the ferrule 410. In embodiments having slots between the coupling members 414, the slots can allow the coupling members to flex apart to allow the tube 420 to be inserted through the ferrule 410. The coupling extension 412 can have any length. In an exemplary embodiment, the coupling extension 412 can have a length equal to or less than the depth of the inner circumferential recess 402, i.e., the distance between the second end 403 of the fitting body 400 and the shoulder surface 404 can be greater than or equal to the length of the coupling extension 412. When the coupling extension 412 is inserted into the inner circumferential recess 402, the first end 411 of the ferrule 410 can contact the second end 403 of the fitting body 400, e.g., as shown in FIG. 4B. The outer diameter of the coupling extension 412 can be approximately the same as the diameter of the inner circumferential recess 402. In some embodiments, there can be a frictional fit or an interference fit between the outer surface of the coupling extension 412 and a surface of the inner circumferential recess 402.

The coupling extension 412 can also include a surface feature, e.g., a projection 418. The projection 418 can be a portion of an end of the coupling extension 412. For example, each of the plurality of coupling members can have a projection 418. The projection 418 can have any shape. In some embodiments, the projection can have a generally triangular shape extending from the coupling extension 412. The projection 418 can extend radially inward from the coupling extension, e.g., the inner diameter of the coupling extension 412 at the projection 418 can be less than the inner diameter of the coupling extension 412 at the intersection between the coupling extension 412 and the first end 411 of the ferrule 410. For example, the inner diameter of the coupling extension 412 at the projection 418 can be less than the outer diameter of the tube 420 such that the coupling extension 412 flexes outward when the tube 420 is disposed through the ferrule 410. The projection 418 of the coupling extension can frictionally engage the outer surface 425 of the tube. The projection 418 can be received in the cutout region 424 of the tube 420. The engagement between the projection 418 and the outer circumferential cutout region 424 of the tube 420 can retains the ferrule 410 on the tube 420. In some embodiments, the ferrule 410 can be freely rotatably on the tube when the projection 418 is received in the cutout region 424. In other embodiments, the projection 418 can frictionally engage the outer surface of the tube in the cutout region 424.

Figures 5A, 5B:
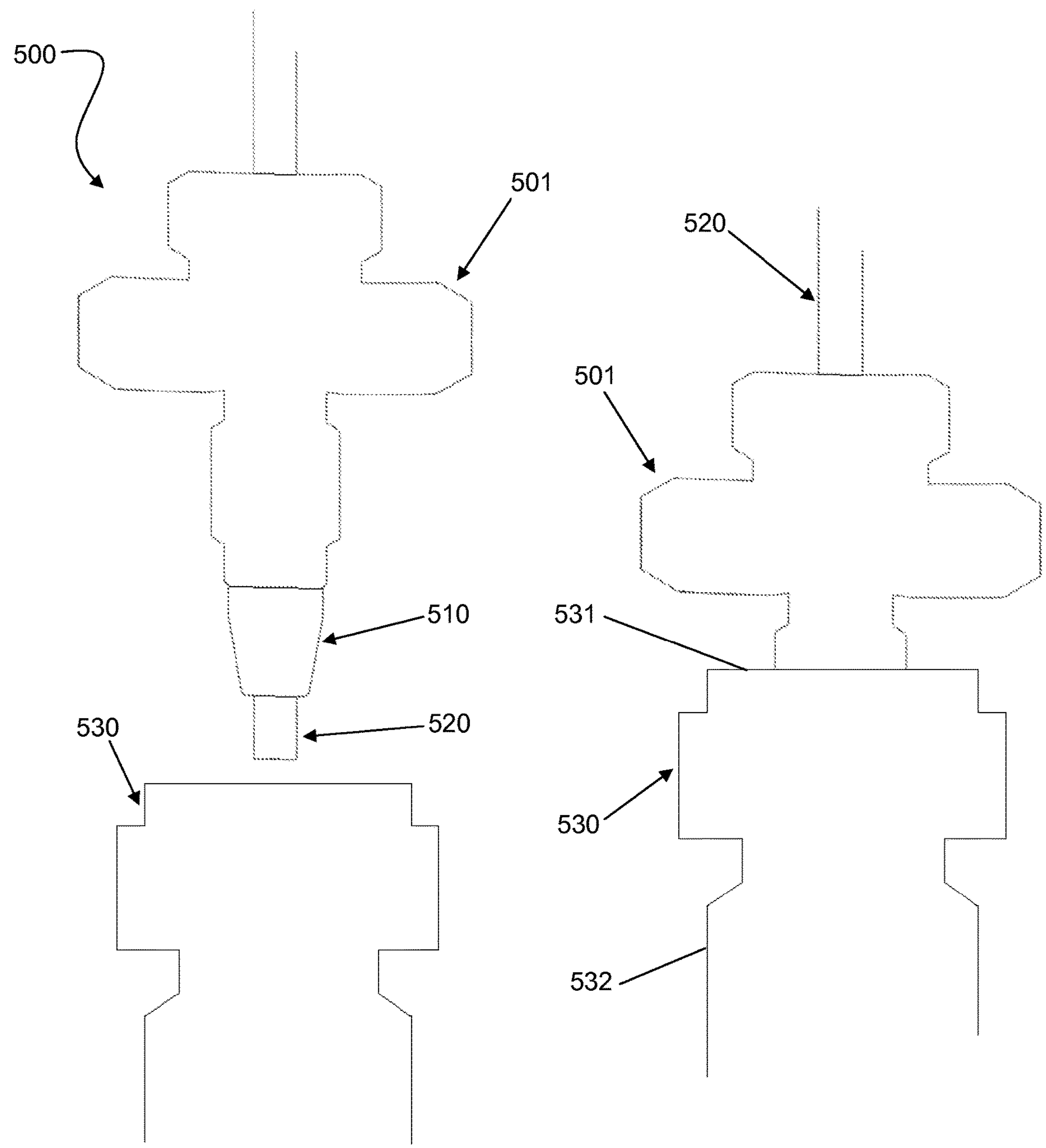
FIG. 5A illustrates a chromatographic system according to an embodiment of the invention.
FIG. 5B illustrates a further view of the chromatographic system of FIG. 5A.

FIGS. 5A and 5B illustrate an embodiment of a chromatographic system. The chromatographic system includes a compression fitting 500 and a chromatographic column 530. FIG. 5A shows the compression fitting 500 and the column 530 prior to insertion of the compression fitting into the column. FIG. 5B shows the compression fitting 500 inserted into the column 530. For example, the compression fitting and column can include cooperating threads that allow the compression fitting to be coupled to the column.

The compression fitting 500 can include a ferrule 510 and a fitting body 520. For example, the compression fitting can include any of the embodiments disclosed in more detail herein. The ferrule 510 can be configured to be coupled to the fitting body 501. For example, either the ferrule 510 or the fitting body 501 can include a coupling extension according to the various embodiments discussed herein. The chromatographic column 530 can be any column known in the art. As illustrated, the column includes a first end 531, a second end (not shown), and a body 531 extending between the first end and the second end. The column ends can include features configured to receive a compression fitting, such as those disclosed herein. For example, the column end can include features of the receiving body 130 discussed above with respect to FIG. 1E.

The chromatographic system can also include a tube 520 configured to be disposed through the fitting body 501 and the ferrule 510, as discussed in more detail above with respect to other embodiments of the present invention. The tube 520 can be in fluid communication with the chromatographic column 530, e.g., with an internal passageway through the column. In exemplary embodiments, the tube can cooperate with the ferrule and the fitting body to couple the ferrule to the fitting body, as discussed in more detail herein.

In some embodiments, the chromatographic column 530 can be disposed in a substantially vertical orientation. For example, in some chromatographic instruments, columns are held vertically to conserve space and to reduce the instrument footprint, among other reasons. A common problem with conventional compression fittings is the loss of the ferrule when the fitting is being inserted or removed from the column. This problem is worsened when the column is vertically oriented. Compression fittings with features according to embodiments of the present invention can prevent a ferrule from sliding off the tubing when before insertion of the fitting assembly into the column, during insertion of the assembly into the column, or when removing the assembly from the receiving body.

The present invention also provides methods of assembling a compression fitting. In an exemplary embodiment, the method includes providing a fitting body, a ferrule, and a tube according to one of the embodiments disclosed herein. Exemplary methods include engaging a ferrule with a fitting body and inserting the tube through the fitting body and the ferrule, where the inserted tube prevents separation of the ferrule and fitting body. For example, in the embodiments shown in FIGS. 1A-1D and FIGS. 2A-2D, the ferrule and fitting body are engaged prior to insertion of the tube therethrough. The interaction between the coupling extension of either the ferrule or the fitting body and the respective inner circumferential recess removably couples the parts to each other, e.g., the ferrule can be removed from the fitting body without damage to either the ferrule or the fitting body. When the tube is disposed through the engaged ferrule and fitting body, the coupling extension cannot be removed from the inner circumferential recess.

In other embodiments, methods include inserting a tube through the fitting body passageway, inserting a ferrule onto the tube, and engaging the ferrule with the fitting body. In some embodiments, the interaction between the coupling extension of the ferrule and the tube can removably couple the ferrule to the tube. For example, in the embodiments shown in FIGS. 3A-3B, the ferrule can be engaged with the fitting body after insertion of the tube through the ferrule. In other embodiments, such as those shown in FIGS. 4A-4B, the ferrule can engage the tube prior to insertion of the ferrule into the fitting body. In these embodiments, the ferrule cannot be removed from fitting body when ferrule is inserted into the fitting body and the tube is disposed through ferrule and fitting body.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A compression fitting comprising:

a fitting body having a first end, a second end, an outer surface and an inner surface, the second end of the fitting body including an inner circumferential recess and the inner surface defining a passageway through the fitting body between the first end and the second end, wherein the inner circumferential recess includes a tapered surface;

a ferrule having a first end, a second end, an outer surface, and an inner surface, the inner surface defining a passageway through the ferrule between the first end and the second end, wherein the ferrule includes an outer surface that is configured to be compressed by the fitting body against a receiving body to provide a fluid tight seal;

a coupling extension extending axially from the first end of the ferrule to an end of the coupling extension, the end of the coupling extension having a projection extending radially outwardly, the coupling extension and the projection configured to be inserted into the inner circumferential recess and removably engage the inner circumferential recess of the fitting body, wherein the coupling extension is flexible such that the coupling extension is configured to flex towards an interior of the passageway of the ferrule; and a tube extending to a tube end, the tube configured to be disposed through the fitting body passageway and the ferrule passageway, wherein the tube prevents the coupling extension from flexing inwards to prevent separation of the ferrule and the fitting body when the coupling extension engages the inner circumferential recess and the tube is disposed through the fitting body passageway and the ferrule passageway, wherein the coupling extension is configured to prevent the ferrule from being removed from the fitting body when the ferrule is proximate the tube end relative to the fitting body, and wherein a space is located between the tapered surface and the projection when the outer surface of the ferrule is compressed by the fitting body against the receiving body to provide the fluid tight seal.

2. The compression fitting of claim 1, wherein the tube cooperates with the ferrule and the fitting body to couple the ferrule to the fitting body.

3. The compression fitting of claim 1, wherein the ferrule is coupled to the fitting body by an interference fit between the tube and the coupling extension of the ferrule.

4. The compression fitting of claim 1, wherein the coupling extension of the ferrule includes a plurality of members.

5. The compression fitting of claim 1, wherein the tube includes an outer cutout region configured to engage the coupling extension of the ferrule.

6. A compression fitting comprising:

a ferrule having a first end, a second end, an outer surface, and an inner surface, the inner surface defining a passageway through the ferrule between the first end and the second end; and a fitting body having a first end, a second end, an outer surface and an inner surface, the inner surface defining a passageway through the fitting body between the first end and the second end, wherein the ferrule includes an outer surface that is configured to be compressed by the fitting body against a receiving body to provide a fluid tight seal;

a coupling extension extending axially from one of the second end of the fitting body and the first end of the ferrule to an end, wherein the other of the first end of the ferrule and the second end of the fitting body includes an inner circumferential recess, wherein the inner circumferential recess includes a tapered surface, wherein the end is configured to be inserted into the inner circumferential recess and to flex inward and removably engage the inner circumferential recess during insertion, wherein the coupling extension is flexible such that the coupling extension is configured to flex towards an interior of one of the passageway of the fitting body and the passageway of the ferrule; and a tube extending to a tube end, the tube configured to be disposed through the fitting body passageway and the ferrule passageway, wherein the tube prevents the coupling extension from flexing inwards to prevent separation of the ferrule and the fitting body when the coupling extension engages the inner circumferential recess and the tube is disposed through the fitting body passageway and the ferrule passageway, wherein the end of the coupling extension includes a projection that extends further radially outwardly than a base of the coupling extension when the tube is disposed through the fitting passageway and the ferrule passageway, wherein the coupling extension is configured to prevent the ferrule from being removed from the fitting body when the ferrule is proximate the tube end relative to the fitting body, and wherein a space is located between the tapered surface and the projection when the outer surface of the ferrule is compressed by the fitting body against the receiving body to provide the fluid tight seal.

7. The compression fitting of claim 6, wherein the tube cooperates with the ferrule and the fitting body to couple the ferrule to the fitting body.

8. The compression fitting of claim 1, wherein the ferrule and the fitting body are configured to be rotatable on the tube.

9. The compression fitting of claim 6, wherein the ferrule and the fitting body are configured to be rotatable on the tube.

10. The compression fitting of claim 1, wherein the ferrule and the fitting body are freely rotatable about the tube when the tube is disposed through the fitting body passageway and the ferrule passageway.

11. The compression fitting of claim 6, wherein the ferrule and the fitting body are freely rotatable about the tube when the tube is disposed through the fitting body passageway and the ferrule passageway.

12. The compression fitting of claim 1, wherein the coupling extension includes a plurality of coupling members each separated by slots configured to allow each of the plurality of coupling members to flex towards the interior of the passageway of the ferrule.

13. The compression fitting of claim 6, wherein the coupling extension includes a plurality of coupling members each separated by slots configured to allow each of the plurality of coupling members to flex towards the interior of the passageway of the ferrule.

* * * * *